(12) United States Patent
Shiotani

(10) Patent No.: US 11,388,293 B2
(45) Date of Patent: Jul. 12, 2022

(54) SCANNING SYSTEM, COMPUTER-READABLE MEDIUM, AND IMAGE SCANNER FOR CONFIGURING SETTING INFORMATION FOR THE IMAGE SCANNER

(71) Applicant: Brother Kogyo Kabushiki Kaisha, Nagoya (JP)

(72) Inventor: Takeshi Shiotani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/315,832

(22) Filed: May 10, 2021

(65) Prior Publication Data
US 2021/0409559 A1 Dec. 30, 2021

(30) Foreign Application Priority Data
Jun. 29, 2020 (JP) .............................. JP2020-111601

(51) Int. Cl.
*G06F 3/12* (2006.01)
*H04N 1/00* (2006.01)
*H04N 1/04* (2006.01)

(52) U.S. Cl.
CPC ....... *H04N 1/00244* (2013.01); *H04N 1/0097* (2013.01); *H04N 1/00129* (2013.01); *H04N 1/00413* (2013.01); *H04N 1/00474* (2013.01); *H04N 1/00973* (2013.01); *H04N 1/04* (2013.01); *H04N 2201/0094* (2013.01)

(58) Field of Classification Search
None
See application file for complete search history.

(56) References Cited

U.S. PATENT DOCUMENTS 10,506,113 B2 * 12/2019 Tsukahara .......... H04N 1/00779
2009/0237728 A1 * 9/2009 Yamamoto ......... H04N 1/00244
358/1.15

(Continued)

FOREIGN PATENT DOCUMENTS

JP 2018-195100 A 12/2018

*Primary Examiner* — Henok Shiferaw
(74) *Attorney, Agent, or Firm* — Burr & Brown, PLLC

(57) ABSTRACT

A scanning system includes an image scanner, an information processing terminal, and a server interconnected via a network. The information processing terminal includes a terminal-side controller to configure setting information according to an operation received via a terminal-side input interface and transmit the setting information to the server along with identification information for identifying the information processing terminal. The image scanner includes a scanner-side controller to store the setting information and the identification information forwarded from the server, into a memory in association with each other, and when receiving, via a scanner-side input interface, an operation for instructing the image scanner to perform image scanning and an operation for specifying the information processing terminal as a destination, perform the image scanning to generate scanned data with the information processing terminal as the destination of the scanned data, based on the setting information associated with the identification information in the memory.

13 Claims, 9 Drawing Sheets

(56) References Cited

U.S. PATENT DOCUMENTS

| | | | |
|---|---|---|---|
| 2013/0258405 A1* | 10/2013 | Tsuya | G06F 3/1293 |
| | | | 358/1.15 |
| 2014/0293312 A1* | 10/2014 | Fukasawa | G06F 3/0488 |
| | | | 358/1.13 |
| 2017/0353621 A1* | 12/2017 | Saito | H04N 1/32406 |
| 2018/0081607 A1* | 3/2018 | Okumura | G06F 3/1258 |
| 2018/0210686 A1* | 7/2018 | Takigawa | H04N 1/4413 |
| 2018/0213095 A1* | 7/2018 | Miura | G06F 3/1259 |
| 2018/0338054 A1* | 11/2018 | Fujiwara | H04L 67/10 |
| 2019/0222701 A1* | 7/2019 | Koelewijn | G06Q 10/06311 |
| 2019/0245854 A1* | 8/2019 | Saito | H04L 63/08 |

\* cited by examiner

| Document Size | Resolution | Color Setting | Scanning Mode | File Format | ADF Skew Correction |
|---|---|---|---|---|---|
| A4<br>A3<br>Auto<br>... | 600 dpi HQ<br>300 dpi STD<br>200 dpi Low<br>... | Color<br>Monochrome<br>... | Duplex<br>Simplex | JPEG<br>TIFF<br>... | Active<br>Inactive |

| Program ID | | | | | |
|---|---|---|---|---|---|
| XXXXXX | | | | | |
| Document Size | Resolution | Color Setting | Scanning Mode | File Format | ADF Skew Correction |
| A4 | 300 dpi STD | Color | Simplex | JPEG | Active |

SCANNING SYSTEM, COMPUTER-READABLE MEDIUM, AND IMAGE SCANNER FOR CONFIGURING SETTING INFORMATION FOR THE IMAGE SCANNER

CROSS-REFERENCE TO RELATED APPLICATION

This application claims priority under 35 U.S.C. § 119 from Japanese Patent Application No. 2020-111601 filed on Jun. 29, 2020. The entire subject matter of the application is incorporated herein by reference.

BACKGROUND

Technical Field

Aspects of the present disclosure are related to a scanning system including an image scanner, an information processing terminal, and a server that are interconnected via a network, for configuring setting information for image scanning by the image scanner.

Related Art

A scanning system has been known that includes an image scanner, an information processing terminal, and a server that are communicably interconnected via a network, and is configured to, when a user directly operates an input interface of the image scanner, cause the image scanner to scan an image recorded on a document, thereby generating scanned data. In the scanning system, the scanned data generated by the image scanner is transmitted to the server and/or the information processing terminal via the network.

SUMMARY

The image scanner performs image scanning based on setting information containing a size of a document sheet to be scanned and a scanning resolution. In the known scanning system, to configure the setting information for the image scanning, the user needs to directly operate the input interface of the image scanner. If the image scanner is provided with an embedded server, the user may download a web page from the embedded server to the information processing terminal and configure the setting information on the web page displayed on the information processing terminal. However, if the image scanner is not provided with an embedded server, the user is required to directly operate the input interface of the image scanner to configure the setting information.

Aspects of the present disclosure are advantageous to provide one or more improved techniques to configure setting information for image scanning by an image scanner connected with a network.

According to aspects of the present disclosure, a scanning system is provided, which includes an image scanner, a server, and an information processing terminal that are interconnected via a network. The image scanner includes a first input interface, a scan engine, and a first controller configured to, when receiving via the first input interface an execution operation for instructing the image scanner to execute image scanning, cause the scan engine to perform the image scanning to generate scanned data based on setting information, and transmit the generated scanned data to at least one of the server and the information processing terminal. The information processing terminal includes a second input interface, and a second controller configured to configure the setting information according to a setting operation received via the second input interface, and transmit the configured setting information to the server via the network along with identification information for identifying the information processing terminal. The server includes a third controller configured to receive the setting information and the identification information transmitted from the information processing terminal, and forward the setting information and the identification information to the image scanner via the network. The first controller of the image scanner is further configured to store the setting information and the identification information forwarded from the server into a first memory in association with each other, the first memory being connected with the first controller, and when receiving, via the first input interface, the execution operation for instructing the image scanner to execute the image scanning and a specifying operation for specifying the information processing terminal as a destination of the scanned data, generate the scanned data with the information processing terminal as the destination of the scanned data, based on the setting information associated with the identification information in the first memory.

According to aspects of the present disclosure, further provided is a non-transitory computer-readable medium storing computer-readable instructions executable by a processor of an information processing terminal connectable with an image scanner and a server via a network. The instructions are configured to, when executed by the processor, cause the information processing terminal to configure setting information according to a setting operation received via an input interface of the information processing terminal, and transmit the configured setting information to the server via the network along with identification information for identifying the information processing terminal, thereby causing the server to forward the setting information to the image scanner. The image scanner is configured to, when receiving an execution operation for instructing the image scanner to execute image scanning via an input interface of the image scanner, cause a scan engine to perform the image scanning to generate scanned data based on the setting information forwarded from the server, and transmit the generated scanned data to at least one of the server and the information processing terminal.

According to aspects of the present disclosure, further provided is a non-transitory computer-readable medium storing computer-readable instructions executable by a processor of a server connectable with an image scanner and an information processing terminal via a network. The instructions are configured to, when executed by the processor, cause the server to receive setting information and identification information from the information processing terminal via the network, the identification information identifying the information processing terminal, and forward the setting information and the identification information to the image scanner via the network. The image scanner is configured to, when receiving an execution operation for instructing the image scanner to execute image scanning via an input interface of the image scanner, cause a scan engine to perform the image scanning to generate scanned data based on the setting information forwarded from the server, and transmit the generated scanned data to at least one of the server and the information processing terminal.

According to aspects of the present disclosure, further provided is an image scanner that includes a communication interface configured to communicate with a server and an information processing terminal via a network, an input interface, a scan engine configured to perform image scanning and generate scanned data based on setting information, and a controller. The controller is configured to receive, via the communication interface, the setting information and identification information forwarded from the information processing terminal through the server, the identification information identifying the information processing terminal, store the setting information and the identification information into a memory in association with each other, the memory being connected with the controller, and when receiving, via the input interface, an execution operation for instructing the image scanner to execute the image scanning and a specifying operation for specifying the information processing terminal as a destination of the scanned data, cause the scan engine to perform the image scanning and generate the scanned data with the information processing terminal as the destination, based on the setting information associated with the identification information in the memory.

BRIEF DESCRIPTION OF THE ACCOMPANYING DRAWINGS

FIG. 4 shows an example of capability information stored in the memory of the MFP, in the first illustrative embodiment according to one or more aspects of the present disclosure.

FIG. 5 shows an example of setting information to be referred to by a controller of the MFP, in the first illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

A scanning system of a first illustrative embodiment according to aspects of the present disclosure will be described with reference to relevant drawings.

Figure 1:
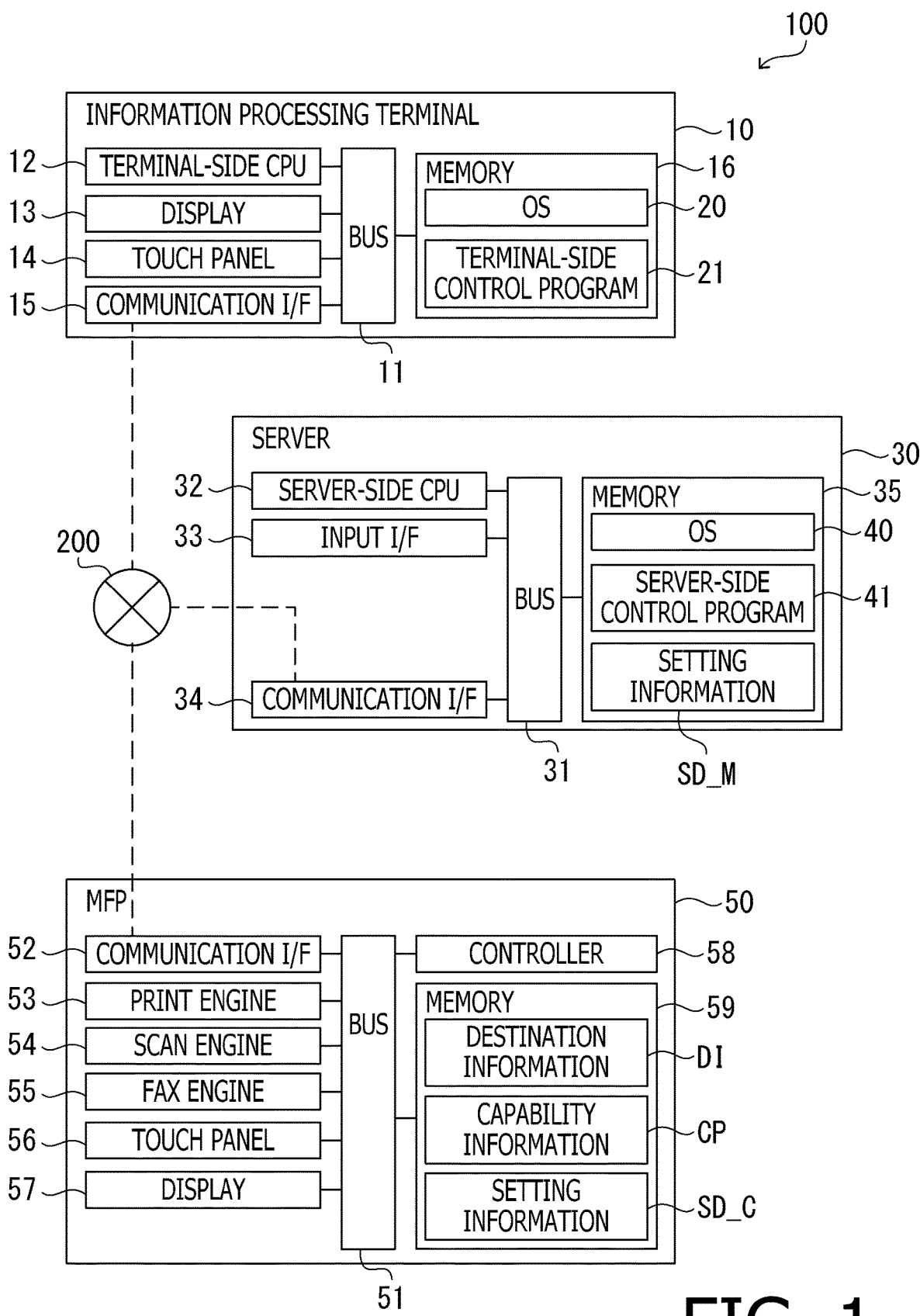
FIG. 1 is a block diagram showing a configuration of a scanning system including an MFP ("MFP" is an abbreviation for "Multi-Function Peripheral/Printer/Product"), a server, and an information processing terminal, in a first illustrative embodiment according to one or more aspects of the present disclosure.

A scanning system 100 shown in FIG. 1 includes an information processing terminal 10, a server 30, and an MFP ("MFP" is an abbreviation for "Multi-Function Peripheral/Printer/Product") 50. The information processing terminal 10, the server 30, and the MFP 50 are connected with a network 200. In the first illustrative embodiment, the network 200 may include at least one of the Internet and a local area network (LAN). In addition, the network 200 may include at least one of a wired network and a wireless network. In the first illustrative embodiment, it is assumed that the information processing terminal 10 and the MFP 50 are connected wirelessly via a router (not shown) included in the network 200, and that the information processing terminal 10 or the MFP 50 are connected with the server 30 via the Internet.

Next, the information processing terminal 10 will be described. Examples of the information processing terminal 10 may include, but are not limited to, a smart phone and a tablet terminal. The information processing terminal 10 includes a bus 11, a terminal-side CPU ("CPU" is an abbreviation for "Central Processing Unit") 12, a display 13, a touch panel 14, a communication I/F ("I/F" is an abbreviation of "interface") 15, and a memory 16. These elements included in the information processing terminal 10 are communicably interconnected via the bus 11.

The display 13 has a display surface for displaying one or more screens. The touch panel 14 has a touch sensor, and is disposed to cover the display surface of the display 13. The touch panel 14 is configured to detect a user's touch operation and output an electrical signal in response to the detection. A concept of "touch" in the first illustrative embodiment may include all operations of bringing an input medium into contact with the display screen. Specifically, a tap operation of releasing a touching input medium from the touch panel 14 within a particular period of time will be described as an example of "touch." However, the concept of "touch" may include, but is not limited to, a long touch operation, a slide operation, a flick operation, a pinch-in operation, and a pinch-out operation. In addition, the concept of "touch" may include an operation of bringing the input medium within a very short distance from the touch panel 14. Furthermore, examples of the input medium may include, but are not limited to, a user's finger, a stylus, and a touch pen. In the first illustrative embodiment, the touch panel 14 may be an example of a "second input interface" according to aspects of the present disclosure. The information processing terminal 10 may include physically provided operable keys as the "second input interface."

For instance, the communication I/F 15 is configured to perform Wi-Fi® (registered trademark) wireless communication based on the IEEE 802.11 standards and equivalent standards. In another instance, the communication I/F 15 may be configured to perform short-range wireless communication such as Bluetooth (registered trademark) with the MFP 50, or perform wireless communication using a mobile communication system via a base station.

The terminal-side CPU 12 is configured to control each element included in the information processing terminal 10 by executing one or more programs stored in the memory 16. The memory 16 includes a RAM ("RAM" is an abbreviation for "Random Access Memory"), a ROM ("ROM" is an abbreviation for "Read Only Memory"), and a flash memory. Further, the memory 16 may include a computer-readable storage medium. Examples of the computer-readable storage medium may include, but are not limited to, recording media such as a CD-ROM and a DVD-ROM.

The memory 16 stores an OS ("OS" is an abbreviation for "Operating System") 20 and a terminal-side control program 21. The terminal-side control program 21 is prepared, for instance, by a vendor of the MFP 50 and installed into the information processing terminal 10 from an application providing server (not shown) via the network 200. The terminal-side CPU 12 and the memory 16 storing the terminal-side control program 21 may form a terminal-side controller to control each element included in the information processing terminal 10. In other words, the terminal-side CPU 12 executing the terminal-side control program 21 stored in the memory 16 may serve as a terminal-side controller. In the following description, a CPU executing a program may be simply referred to with a name of the program. For instance, a description "the terminal-side control program 21" may represent "the CPU executing the terminal-side control program 21."

In the following description, processing by each CPU according to instructions described in programs will be basically shown. Namely, processes such as "judging," "extracting," "selecting," "calculating," "determining," "specifying," "identifying," "obtaining," "accepting," "receiving," "controlling," and "setting" in the following description may represent processing by a CPU. The processing by each CPU may include hardware control via an OS therefor. It is noted that "obtaining" may be used as a concept that does not necessarily require a request. Namely, for instance, a process of the terminal-side control program 21 receiving data without making a request may be included in a concept of "the terminal-side CPU 12 obtains data." Further, "data" in the following description may be expressed in a computer-readable format. Additionally, a plurality of pieces of data having substantially the same meaning or content but expressed in different formats shall be treated as the same data. The same applies to "information" in the following description.

The OS 20 has an API ("API" is an abbreviation for "Application Programming Interface") that enables the terminal-side control program 21 to use functions of the OS 20, to communicate with the server 30 and the MFP 50, and to use functions of other programs.

The terminal-side control program 21 is a program for causing the MFP 50 connectable via the communication I/F 15 to perform printing, scanning, faxing, and other operations. In the first illustrative embodiment, the terminal-side control program 21 is launched in response to a startup icon for activating the terminal-side control program 21 being touched on the display 13 of the information processing terminal 10.

Next, a hardware configuration of the server 30 will be described. The server 30 includes a bus 31, a server-side CPU 32, an input I/F 33, a communication I/F 34, and a memory 35. These elements included in the server 30 are communicably interconnected via the bus 31. The memory 35 stores an OS 40 and a server-side control program 41. The OS 40 is configured to cause the server 30 to connect with the network 200 via the communication I/F 34. The server-side control program 41 is for controlling communication between the information processing terminal 10 and the MFP 50 via the network 200 when below-mentioned push-scanning is performed. The server-side CPU 32 and the memory 35 storing the server-side control program 41 may form a server-side controller to control each element included in the server 30. In other words, the server-side CPU 32 executing the server-side control program 41 stored in the memory 35 may serve as a server-side controller.

The server-side control program 41 is configured to, when executed by the server-side CPU 32, cause the server 30 to send a push notification to the information processing terminal 10 even without a request from the information processing terminal 10 as a client. When receiving the push notification from the server 30, the terminal-side CPU 12 launches the terminal-side control program 21 stored in the memory 16. Examples of available services for sending push notifications may include, but are not limited to, APNS ("APNS" is an abbreviation for "Apple Push Notification Service") and GCM ("GCM" is an abbreviation for "Google Cloud Messaging for Android"). In the first illustrative embodiment, it is assumed that, to use the services such as APNS and GCM, the server 30 has already registered an address indicating a location of the information processing terminal 10 that uses the services.

Subsequently, a hardware configuration of the MFP 50 will be described. The MFP 50 includes a bus 51, a communication I/F 52, a print engine 53, a scan engine 54, a fax engine 55, a touch panel 56, a display 57, a controller 58, and a memory 59. These elements included in the MFP 50 are communicably interconnected via the bus 51.

The communication I/F 52 is configured to connect the MFP 50 with the network 200 therethrough in compliance with a particular communication protocol. The touch panel 56 is an interface configured to display operable icons for accepting user operations and provide the controller 58 with an input according to a user operation accepted via one of the operable icons. The controller 58 is configured to control operations by the print engine 53, the scan engine 54, the fax engine 55, and the display 57.

The print engine 53 is configured to perform a printing operation to print an image on a recording medium such as a sheet or a disk. Specifically, the controller 58 analyzes job data transmitted by the information processing terminal 10 and prints an image by discharging ink onto the recording medium. Applicable recording methods for the print engine 53 may include, but are not limited to, an inkjet method to discharge ink onto a recording medium, and an electrophotographic method to form a toner image on a photoconductive body and transfer the formed toner image onto a recording medium. The scan engine 54 is configured to perform a scanning operation to scan an image recorded on a document and generate scanned image data. The controller 58 of the MFP 50 is configured to cause the scan engine 54 to scan a document placed on an ADF ("ADF" is an abbreviation for "Automatic Document Feeder") or a scanning table and generate scanned data, and to transmit the generated scanned data to at least one of the server 30 and the information processing terminal 10 via the communication I/F 52. The fax engine 55 is configured to send and receive image data in a method compliant with a fax protocol. The MFP 50 may be configured to perform a combined operation including a plurality of operations. A copy operation including a printing operation by the print engine 53 and a scanning operation by the scan engine 54 may be an example of the combined operation.

The touch panel 56 has a touch sensor, and is disposed to cover a display surface of the display 57. The touch panel 56 is configured to detect a user's touch operation and output an electrical signal in response to the detection. In the first illustrative embodiment, the touch panel 56 may be an example of a "first input interface" according to aspects of the present disclosure. The MFP 50 may include physically provided operable keys as the "first input interface."

Figures 2, 3:
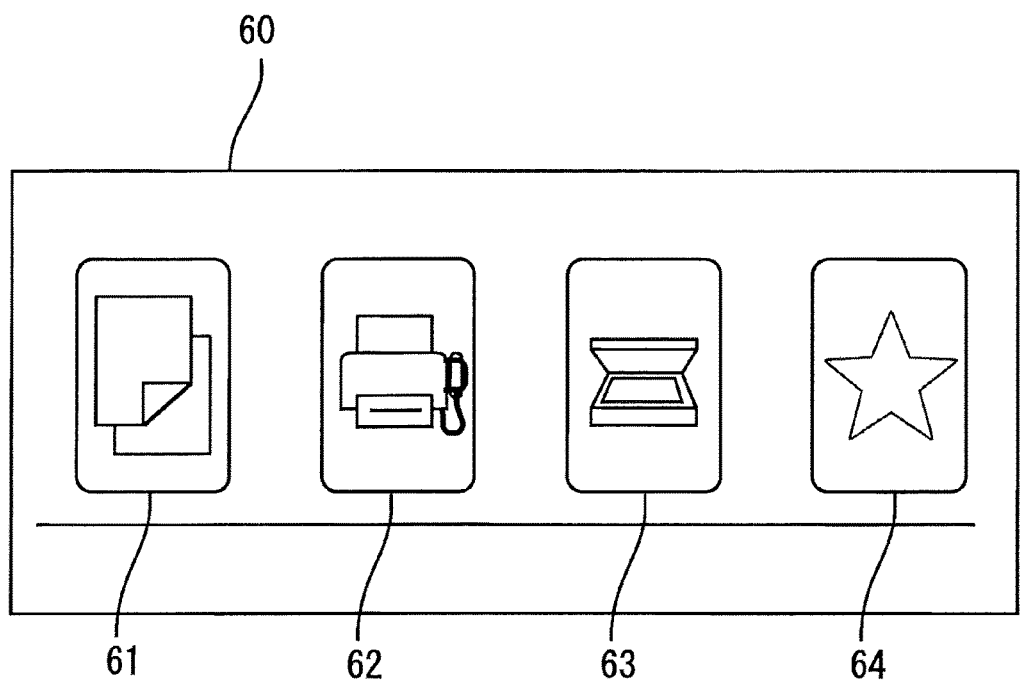
FIG. 2 shows an example of an operation screen displayed on a display of the MFP, in the first illustrative embodiment according to one or more aspects of the present disclosure.
FIG. 3 shows an example of destination information stored in a memory of the MFP, in the first illustrative embodiment according to one or more aspects of the present disclosure.

FIG. 2 shows an operation screen 60 displayed on the display 57. The operation screen 60 is displayed on the display 57 by the controller 58 in response to the MFP 50 being powered on. The operation screen 60 includes operable icons 61, 62, 63, and 64. The operable icon 61 is configured to accept a user operation to specify a copy operation as an operation to be performed by the MFP 50. In the copy operation, the MFP 50 causes the scan engine 54 to scan an image recorded on a document, and causes the print engine 53 to print the scanned image on a recording medium. The operable icon 62 is configured to accept a user operation to specify a fax operation as an operation to be performed by the MFP 50. In the fax operation, the MFP 50 causes the scan engine 54 to scan an image recorded on a document, and causes the fax engine 55 to send the scanned image as fax data to a specified destination. The operable icon 64 is configured to accept a user operation to specify a favorite operation or favorite settings registered by the user.

The operable icon 63 is configured to accept a user operation to specify push-scanning as an operation to be performed by the MFP 50. In the push-scanning, the MFP 50 causes the scan engine 54 to scan an image recorded on a document, generate scanned data, and transmit the generated scanned data to the information processing terminal 10 and/or the server 30. Specifically, when the MFP 50 uploads the scanned data to the server 30 with the information processing terminal 10 as a destination, the server 30 sends a push notification to the information processing terminal 10. When receiving the push notification from the server 30, the information processing terminal 10 downloads the scanned data from the server 30.

The controller 58 includes a CPU and an ASIC ("ASIC" is an abbreviation for "Application Specific Integrated Circuit"). The controller 58 is configured to control each element included in the MFP 50. The memory 59 stores various programs to be executed by the controller 58. The memory 59 may store an EWS ("EWS" is an abbreviation for "Embedded Web Server") program. The controller 58 is configured to cause the MFP 50 to function as a Web server by executing the EWS program.

The memory 59 stores destination information DI, capability information CP, and setting information SD as data to be referred to by the controller 58. The destination information DI is for identifying a destination device to which scanned data generated in a scanning operation is to be transmitted. Each destination information DI shown in FIG. 3 includes items "Display Name" and "Program ID." The item "Display Name" is information that indicates a name of each destination device when each destination device is displayed on the display 57. The "Program ID" is an ID for identifying a control program stored in each destination device. For instance, with respect to the information processing terminal 10, the program ID associated therewith is an ID for identifying the terminal-side control program 21.

Next, the capability information CP will be described with reference to FIG. 4. The capability information CP contains a plurality of items indicating capabilities of the MFP 50. For instance, the capability information CP is structure-form information. Specifically, the capability information CP stores, as items regarding the scanning operation, "Document Size," "Resolution," "Color Setting," "Scanning Mode," "File Format," and "ADF Skew Correction." The "Document Size" is information that indicates a scanning range for a document to be applied when the MFP 50 performs a scanning operation to scan the document. More specifically, for instance, "A4" as the "Document Size" indicates that the document will be scanned in an A4-size scanning range. In addition, "A3" indicates that the document will be scanned in an A3-size scanning range. Further, "Auto" indicates that the scanning range will be adjusted automatically according to an actual size of the document. The "Resolution" is information that indicates a resolution of scanned data to be applied when the MFP 50 performs the scanning operation to scan the document and generate the scanned data. More specifically, for instance, "600 dpi HQ" as the "Resolution" indicates that the document will be scanned at a resolution of 600 dpi. In addition, "300 dpi STD" indicates that the document will be scanned at a resolution of 300 dpi. Further, "200 dpi Low" indicates that the document will be scanned at a resolution of 200 dpi. The "Color Setting" is information regarding colors of the scanned data to be applied when the MFP 50 performs the scanning operation. More specifically, for instance, "Color" as the "Color Setting" indicates that the scanned data will be generated with color information. Meanwhile, "Monochrome" indicates that the scanned data will be generated without color information.

The "Scanning Format" is information that indicates scanning side(s) (duplex or simplex) of the document to be specified when the MFP 50 performs the scanning operation. Specifically, "Simplex" as the "Scanning Format" indicates that only one side of the document is specified as the scanning side. Meanwhile, "Duplex" indicates that both sides of the document are specified as the scanning sides. The "File Format" is information that indicates a file format of the scanned data to be specified when the MFP 50 performs the scanning operation. Specifically, for instance, "JPEG" indicates that JPEG is specified as the file format. Further, "TIFE" indicates that TIFE is specified as the file format. The "ADF Skew Correction" is information that indicates whether to correct the skew of the scanned image when the MFP 50 performs the scanning operation to scan the document set on the ADF.

Further, the capability information CP may contain items of "brightness," "contrast," and "blank sheet removal."

Next, the setting information SD will be described with reference to FIG. 5. The setting information SD is information that indicates settings for a push-scanning operation to be performed by the MFP 50. The setting information SD is referred to by the controller 58. The setting information SD shown in FIG. 5 contains the same items as contained in the capability information CP (see FIG. 4), i.e., "Document Size," "Resolution," "Color Setting," "Scanning Mode," "File Format," and "ADF Skew Correction." In the setting information SD, each element for each item corresponds to one of the elements for the same item contained in the capability information CP.

In the first illustrative embodiment, a plurality of pieces of setting information SD are stored, each of which is associated with the program ID for identifying the terminal-side control program 21 of a corresponding information processing terminal 10, in the memory 59 of the MPF 50 and in the memory 35 of the server 30. Specifically, each setting information SD (see FIG. 5) includes the program ID. Thus, by referring to the program ID included in each setting information SD. it is possible to determine which information processing terminal 10 each setting information SD is associated with. The setting information SD stored in the memory 35 of the server 30 is managed as a master. The setting information SD stored in the memory 59 of the MPF 50 is managed as a cache. In the following description, the setting information SD stored in the memory 35 of the server 30 may be referred to as the "setting information SD_M," and the setting information SD stored in the MPF 50 may be referred to as the "setting information SD_C," to distinguish between the both of the setting information SD.

Figure 6:
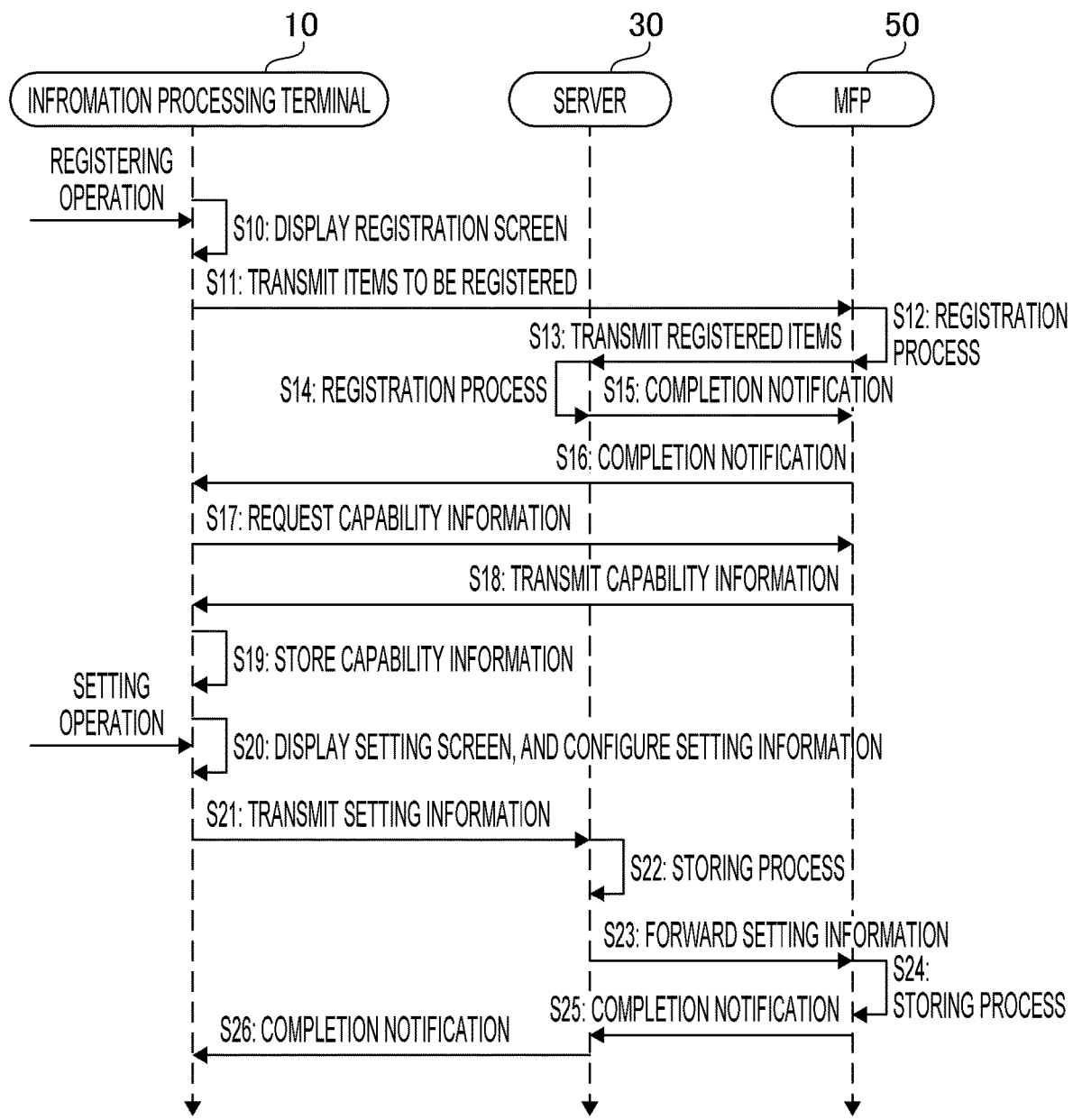
FIG. 6 is a timing chart showing a sequence of processes to configure the setting information when the information processing terminal is newly registered, in the first illustrative embodiment according to one or more aspects of the present disclosure.

Next, referring to FIG. 6, an explanation will be provided of a sequence of processes in which the setting information SD is configured on an information processing terminal 10 side and stored into the server 30 and the MFP 50. The processes shown in FIG. 6 are performed by the terminal-side CPU 12 executing the terminal-side control program 21, the server-side CPU 32 executing the server-side control program 41, and the controller 58 of the MFP 50. The processes of S11 and S16 to S18 in FIG. 6 are performed via local communication, such as short-distance wireless communication, between the information processing terminal 10 and the MFP 50.

In S10, the terminal-side CPU 12 executing the terminal-side control program 21 displays a registration screen on the display 13 and receives a user operation to input registration information via the touch panel 14. The registration screen is for registering the information processing terminal 10 with the destination information DI of the MFP 50 in response to a user operation. For instance, on the registration screen, a selection of an MFP (in the first illustrative embodiment, the MFP 50) as a registration destination in which the information processing terminal 10 is to be registered, and an input of the "Display Name" among the items of the destination information DI (see FIG. 3) of the selected MFP are accepted. The "Program ID" of the destination information DI is automatically set by the terminal-side CPU 12.

In S11, the terminal-side CPU 12 transmits the items set in S10 along with a registration request, to the MFP 50 selected as the registration destination. In S12, the controller 58 of the MFP 50 performs a registration process to register the items received from the information processing terminal 10 with the destination information DI. Thereby, the information processing terminal 10 is registered as a destination candidate in the MFP 50. In S13, the controller 58 transmits, to the server 30, the items registered in S12 and identification information of the MFP 50 along with a registration request.

In S14, the server-side CPU 32 stores the items received from the MFP 50 into the memory 35, thereby storing the destination information DI regarding the information processing terminal 10. Thereby, the server 30 is enabled to determine that the information processing terminal 10 has been registered as a candidate destination for the MFP 50. In S15, the server-side CPU 32 sends, to the MFP 50, a completion notification representing that the registration has been completed. In S16, the controller 58 of the MPF 50 sends, to the information processing terminal 10, a completion notification representing that the registration has been completed.

In S17, the terminal-side CPU 12 transmits a request for the capability information CP to the MFP 50. In S18, the controller 58 of the MFP 50 reads out the capability information CP stored in the memory 59, and transmits the read capability information CP to the information processing terminal 10. In S19, the terminal-side CPU 12 stores the capability information CP received from the MFP 50 into the memory 16.

Figure 7:
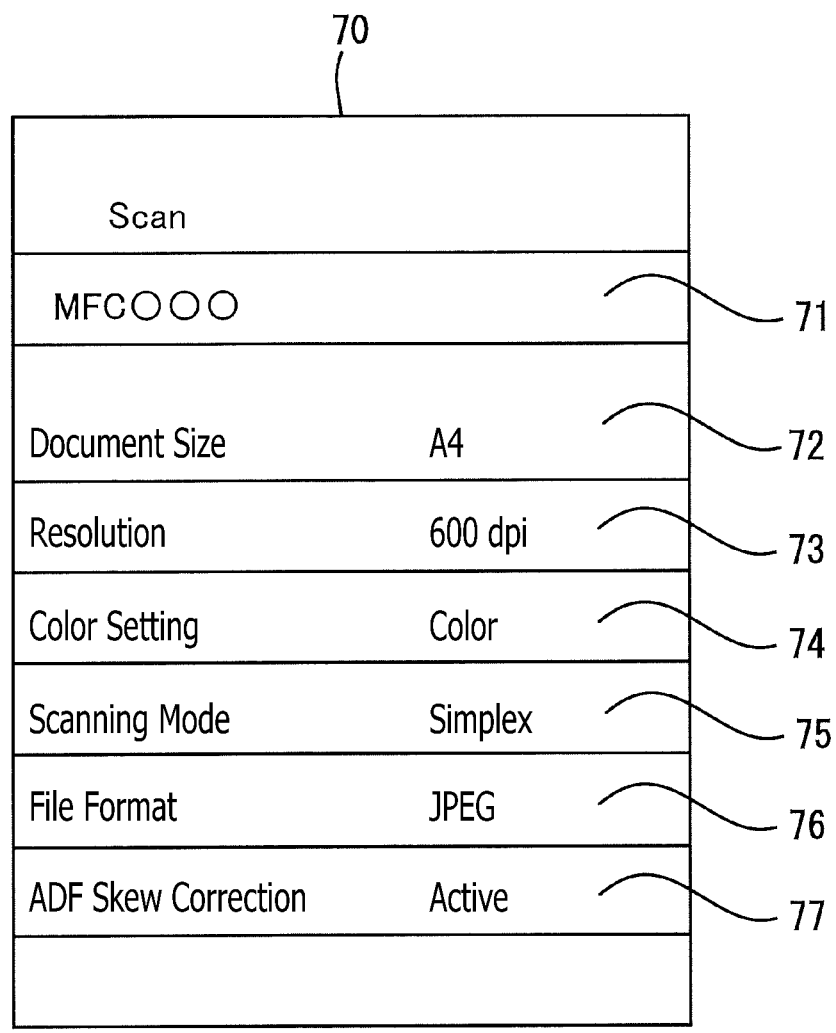
FIG. 7 shows an example of a setting screen displayed on the display of the information processing terminal, in the first illustrative embodiment according to one or more aspects of the present disclosure.

In S20, the terminal-side CPU 12 displays on the display 13 a setting screen 70 (see FIG. 7) configured to receive user operations to configure the setting information SD of the MFP 50, and configures the setting information SD in response to user operations received via the setting screen 70. FIG. 7 shows an example of the setting screen 70 displayed on the display 13. The setting screen 70 includes an area 71 in which a device name of the MFP 50 to perform a scanning operation is displayed, and pull-down lists 72 to 77 each of which is configured to accept designation of a setting value from among settable values for a corresponding item of the setting information SD. Specifically, the setting screen 70 shown in FIG. 7 includes the pull-down lists 72 to 77 corresponding to the items "Document Size," "Resolution," "Color Setting," "Scanning Mode," "File Format," and "ADF Skew Correction," respectively. The options (i.e., the settable values) in each of the pull-down lists 72-77 are referred to from the capability information CP stored in S19. Specifically, the setting value "A4" for the item "Document Size" on the setting screen 70 is a default value among the options for the item "Document Size" in the capability information CP. By touching each of the pull-down lists 72 to 77, the user may change the setting value within a range of the settable values for a corresponding item stored in the capability information CP. For instance, the user may touch and operate the pull-down list 72 to change the setting value displayed on the setting screen 70 to another value among the settable values "A4," "A3," and "Automatic" for the item "Document Size" in the capability information CP.

Referring back to FIG. 6, the processes of S21, S23, S25, and S26 are performed via wireless communication through the network 200, i.e., in an infrastructure mode. For instance, when the user touches and operates an icon indicating that the configuring of the setting information SD has been completed, in S21, the terminal-side CPU 12 transmits the configured setting information SD to the server 30 along with the program ID corresponding to the information processing terminal 10.

In S22, the server-side CPU 32 of the server 30 stores the setting information SD and the program ID transmitted by the information processing terminal 10 in S21 into the memory 35 in association with each other. The setting information SD_M stored in the memory 35 of the server 30 is managed as a master. In S23, the server-side CPU 32 forwards the setting information SD and the program ID to the MFP 50.

In S24, the controller 58 of the MFP 50 stores the setting information SD and the program ID received from the server 30 into the memory 59 in association with each other. The setting information SD_C stored in the memory 59 of the MFP 50 is managed as a cache. In S25, the controller 58 sends, to the server 30, a completion notification representing that the registration of the setting information SD_C has been completed. In S26, when receiving the completion notification from the MFP 50, the server-side CPU 32 sends to the information processing terminal 10 a completion notification representing that the registration of the setting information SD_M has been completed. The terminal-side CPU 12 receives the completion notification from the server 30, thereby determining that the registration of the setting information SD has been completed.

Figure 8:
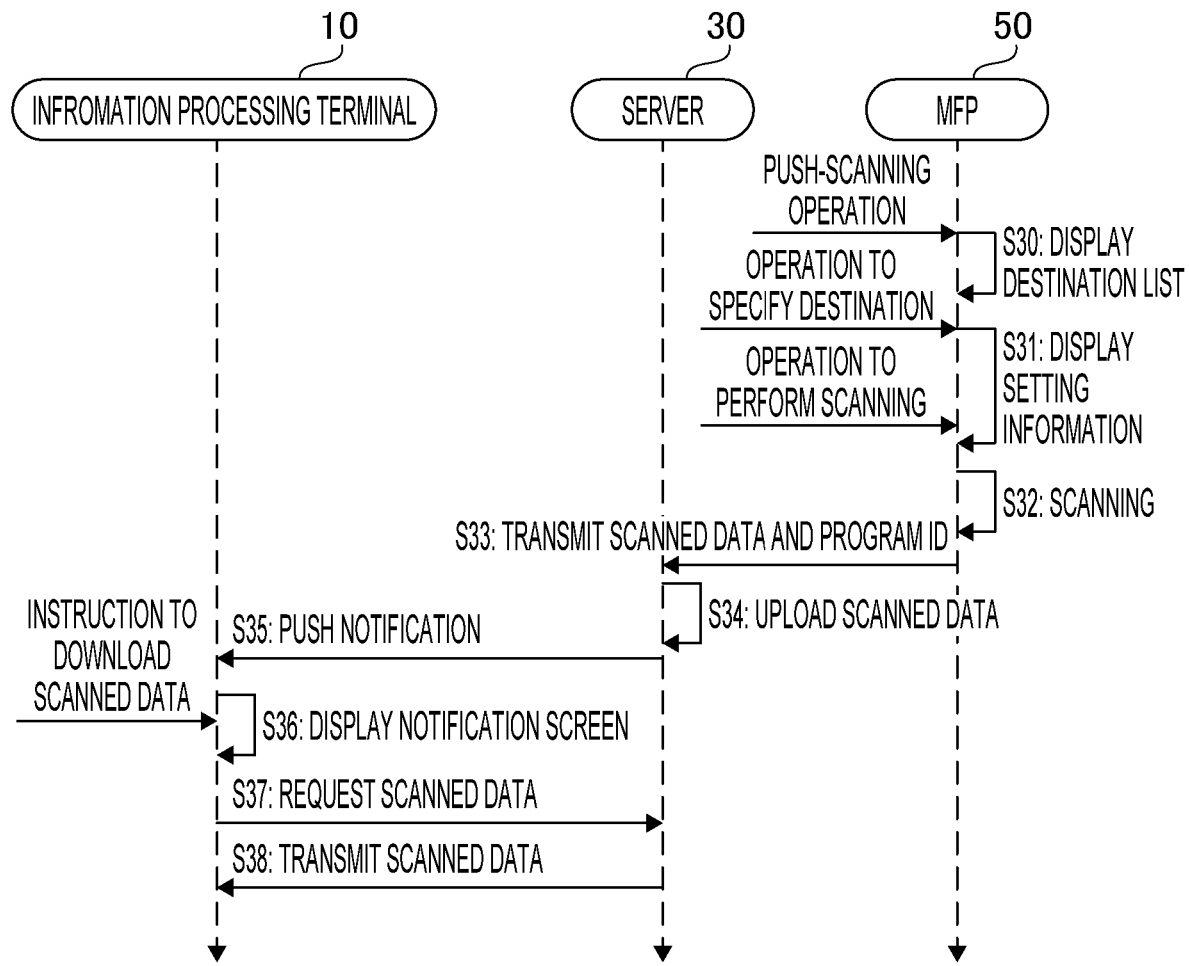
FIG. 8 is a timing chart showing a sequence of processes to be performed among the information processing terminal, the server, and the MFP when push-scanning is performed, in the first illustrative embodiment according to one or more aspects of the present disclosure.

Subsequently, referring to FIG. 8, an explanation will be provided of a sequence of processes to be performed among the information processing terminal 10, the server 30, and the MFP 50 when push-scanning is performed. The processes shown in FIG. 8 are performed by the terminal-side CPU 12 executing the terminal-side control program 21, the server-side CPU 32 executing the server-side control program 41, and the controller 58 of the MFP 50. Further, the sequence of processes shown in FIG. 8 becomes executable after the setting information SD regarding the information processing terminal 10 has been stored in the MFP 50 in the sequence of processes shown in FIG. 6.

When the user touches and operates the operable icon 63, in S30, the controller 58 of the MFP 50 displays a destination list on the touch panel 56. In the destination list displayed on the touch panel 56, the display names of the destination candidates stored in the destination information DI are listed.

When the user touches and operates the touch panel 56 to specify the display name corresponding to the information processing terminal 10 from among the display names displayed in the destination list, in S31, the controller 58 displays the setting information SD_C associated with the specified display name on the display 57. Specifically, the controller 58 reads out the program ID associated with the specified display name in the destination information DI, and displays the setting information SD_C associated with the read program ID on the display 57. More specifically, the display 57 shows thereon the respective setting values for the items "Document Size," "Resolution," "Color Setting," "Scanning Mode," "File Format," and "ADF Skew Correction" in the setting information SD stored in S24 of FIG. 6. Each of the displayed setting values may be changed by a user operation within the range of the settable values included in the capability information CP.

In the first illustrative embodiment, the display 57 shows thereon an operable icon for determining to execute the scanning operation, and an operable icon for cancelling the execution of the scanning operation, along with the setting information SD_C. When the user touches and operates the operable icon for determining to execute the scanning operation, in S32, the controller 58 performs the scanning operation using the setting information SD_C displayed in S31, and generates scanned data. Namely, in S32, the scanned data is generated using the setting information SD_C corresponding to the information processing terminal 10 specified by the user. If the user touches and operates the operable icon for cancelling the execution of the scanning operation, the controller 58 does not execute the scanning operation.

In S33, the controller 58 transmits the scanned data generated in S32 to the server 30, with designation of the terminal (i.e., the information processing terminal 10) specified by the user as a destination of the scanned data. Specifically, the controller 58 transmits to the server 30 the program ID associated with the display name specified in the destination information DI along with the scanned data generated in S32.

In S34, the server-side CPU 32 stores the scanned data received from the MFP 50 into the memory 35, thereby uploading the scanned data. In S35, the server-side CPU 32 sends a push notification to the information processing terminal 10 that is the destination candidate identified by the program ID transmitted by the MFP 50. As described above, the memory 35 of the server 30 stores therein an address of the information processing terminal 10 as the destination in association with the program ID. Therefore, it is possible to identify a location of the information processing terminal 10 as the destination candidate. At this time, the server-side CPU 32 may transmit a data ID for identifying the scanned data along with the push notification.

When receiving the push notification from the server 30, the terminal-side CPU 12 of the information processing terminal 10 displays a notification screen on the display 13 in S36. Specifically, the terminal-side CPU 12 launches the terminal-side control program 21, and displays the notification screen on the display 13 by a function provided by the launched terminal-side control program 21. The notification screen includes a text and/or an icon for notifying the user that the scanned data has been uploaded to the server 30, and further includes an icon for accepting an operation to download the uploaded scanned data.

When receiving a user operation to provide an instruction to download the scanned data on the notification screen, in S37, the terminal-side CPU 12 sends a request for the uploaded scanned data to the server 30. In S38, the server-side CPU 32 of the server 30 transmits the scanned data to the information processing terminal 10, in response to the request transmitted by the information processing terminal 10 in S37. Thereby, the scanned data is downloaded to the information processing terminal 10.

Figure 9:
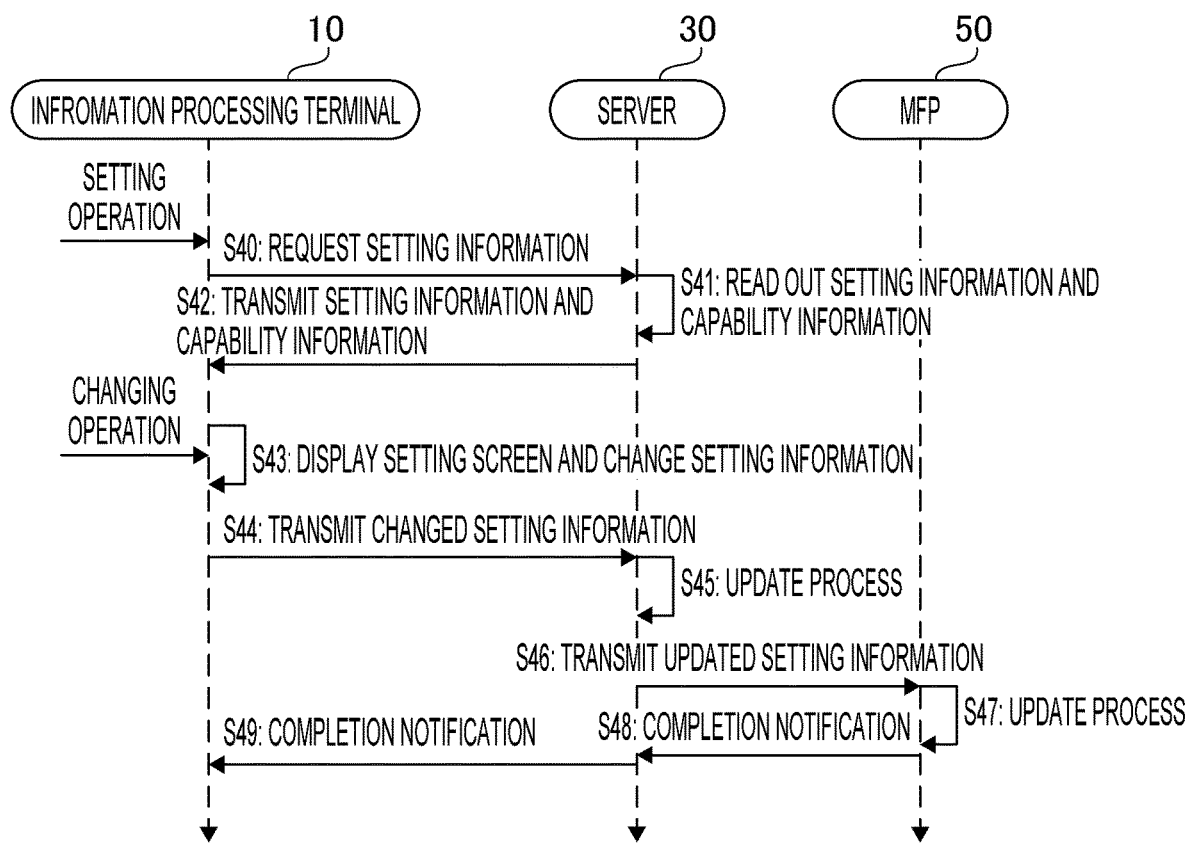
FIG. 9 is a timing chart showing a sequence of processes to be performed among the information processing terminal, the server, and the MFP when the setting information is changed, in the first illustrative embodiment according to one or more aspects of the present disclosure.

Next, referring to FIG. 9, an explanation will be provided of a sequence of processes in which the setting information SD, already stored in the server 30 and the MFP 50, is changed on the information processing terminal 10 side. When receiving a user operation to start changing the setting information SD via the touch panel 14, in S40, the terminal-side CPU 12 of the information processing terminal 10 sends to the server 40 a request for the setting information SD along with the program ID for identifying the information processing terminal 10 and the identification information of the MFP 50. In a situation where the setting information SD is to be changed, the server 30 has already managed the setting information SD_M as a master. Therefore, the terminal-side CPU 12 transmits a request for the setting information SD_M to the server 30.

In S41, the server-side CPU 32 of the server 30 reads out the capability information CP of the MFP 50 and the setting information SD_M associated with the program ID, in response to the request transmitted by the information processing terminal 10 in S40. About the capability information CP of the MFP 50, for instance, the server-side CPU 32 may send an inquiry to the MFP 50 based on the identification information of the MFP 50 received in S13. In another instance, the server 30 may previously store therein the capability information CP of the MFP 50. In S42, the server-side CPU 32 transmits to the information processing terminal 10 the capability information CP and the setting information SD read out in S41.

In S43, when receiving the capability information CP and the setting information SD from the server 30, the terminal-side CPU 12 displays a setting screen for changing the setting information SD on the display 13, and accepts user operations to change the setting information SD. The setting screen displayed in S43 may be the same as the setting screen 70 shown in FIG. 7. Therefore, in S43, the terminal-side CPU 12 may change the setting value for each item in the setting information SD to another value within the range of settable values included in the obtained capability information CP. For instance, in the capability information CP shown in FIG. 4, "Duplex" and "Simplex" are registered as settable values for the item "Scanning Mode." Therefore, the setting value for the item "Scanning Mode" in the setting information SD may be changed to another value between "Duplex" and "Simplex." The same applies to the other items "Resolution," "Color Setting," "Document Size," "File Format," and "ADF Skew Correction."

In S44, the terminal-side CPU 12 transmits the setting information SD changed in S43 to the server 30 along with the identification information of the MFP 50 and the program ID corresponding to the information processing terminal 10. In S45, the server-side CPU 32 updates the setting information SD associated with the program ID transmitted by the information processing terminal 10 to the changed setting information SD transmitted in S44. In S46, the server-side CPU 32 forwards the updated setting information SD and the program ID to the MFP 50.

In S47, the controller 58 of the MFP 50 updates the setting information SD associated with the program ID received from the server 30 to the changed setting information SD. In S48, the MFP 50 sends, to the server 30, a completion notification representing that the change of the setting information SD_C has been completed. In S49, when receiving the completion notification from the MFP 50, the server-side CPU 32 sends, to the information processing terminal 10, a completion notification representing that the server 30 has completed storing the setting information SD_M. Thereby, the terminal-side CPU 12 is enabled to determine that the change of the setting information SD has been completed.

The first illustrative embodiment described above produces the following advantageous effects. The terminal-side CPU 12 configures the setting information SD in response to the operations accepted via the touch panel 14, and transmits the setting information SD along with the program ID, to the server 30 via the network 200. The server-side CPU 32 forwards the setting information SD and the program ID received from the information processing terminal 10, to the MPF 50 via the network 200. The controller 58 of the MPF 50 stores the setting information SD and the program ID received from the server 30 into the memory 59 in association with each other. When receiving, via the touch panel 56, a user operation to specify the information processing terminal 10 as a destination to which scanned data is to be sent and a user operation to instruct the MFP 50 to perform a scanning operation, the controller 58 generates the scanned data with designation of the information processing terminal 10 as the destination of the scanned data, based on the setting information SD associated with the program ID for the information processing terminal 10 stored in the memory 19. Thus, by operating the information processing terminal 10, the user is allowed to store, into the MFP 50, the setting information SD used to generate the scanned data with the information processing terminal 10 as the destination of the scanned data, and to generate the scanned data according to the setting information SD. At this time, the setting information SD configured by the information processing terminal 10 is transmitted to the MFP 50 via the server 30. Therefore, it is possible to store the setting information SD in the MFP 50 using a communication mode via the server 30.

The terminal-side CPU 12 obtains the setting information SD stored in the memory 35 of the server 30, and changes the setting information SD in accordance with user operations accepted via the touch panel 14. Thereby, the user who operates the information processing terminal 10 is allowed to change the setting information SD used for the scanning operation in each attempt to cause the MFP 50 to perform the scanning operation.

When receiving, via the touch panel 56, an operation to specify a destination device, the controller 58 displays on the display 57 the setting information SD associated with the specified destination device among the one or more pieces of setting information SD stored in the memory 59. Thereby, the user is allowed to check the settings for the scanning operation before the user causes the MFP 50 to perform the scanning operation by operating the touch panel 56 of the MFP 50.

The terminal-side CPU 12 obtains the capability information CP of the MFP 50 from the MFP 50, and configures the setting information SD according to the operations accepted via the touch panel 14 within the range of settable values included in the obtained capability information CP. Thus, the setting information SD configurable by the information processing terminal 10 is configured within the range of the capabilities of the MFP 50. Therefore, it is possible to suppress adverse influences on the scanning operation that could be caused by changing the setting information SD via the information processing terminal 10.

Modifications of First Illustrative Embodiment

In the aforementioned first illustrative embodiment, the terminal-side CPU 12 receives the setting information SD_M from the server 30 in a situation where the setting information SD is changed. Instead, the terminal-side CPU 12 may receive the setting information SD_C from the MFP 50. In this case, the terminal-side CPU 12 may send a request for the capability information CP and the setting information SD to the MFP 50 in S40 of FIG. 9. The controller 58 of the MFP 50 may transmit the capability information CP and the setting information SD to the information processing terminal 10. After changing the setting information SD in S43, the terminal-side CPU 12 may transmit the changed setting information SD to the server 30 in S44.

After registering the information processing terminal 10 as the destination of the scanned data, the MFP 50 may cancel the registration of the information processing terminal 10. In this case, in S43 of FIG. 9, when receiving via the setting screen a user operation to cancel the registered information processing terminal 10, in S44, the terminal-side CPU 12 may send to the server 30 a cancellation request along with the identification information of the information processing terminal 10 to be cancelled. When receiving the cancellation request along with the identification information, in S45, the server-side CPU 32 may delete the setting information SD_M of the information processing terminal 10 to be cancelled. In S46, the server-side CPU 32 may forward, to the MFP 50, the cancellation request along with the identification information of the information processing terminal 10 to be cancelled. When receiving the cancellation request from the server 30, in S47, the controller 58 may delete the setting information SD of the information processing terminal 10 to be cancelled.

Second Illustrative Embodiment

In a second illustrative embodiment according to aspects of the present disclosure, different configurations from the aforementioned first illustrative embodiment will be mainly explained. In the second illustrative embodiment, each element having substantially the same configuration as in the first illustrative embodiment will be provided with the same reference numeral as in the first illustrative embodiment, and an explanation thereof may be omitted.

Figure 10:
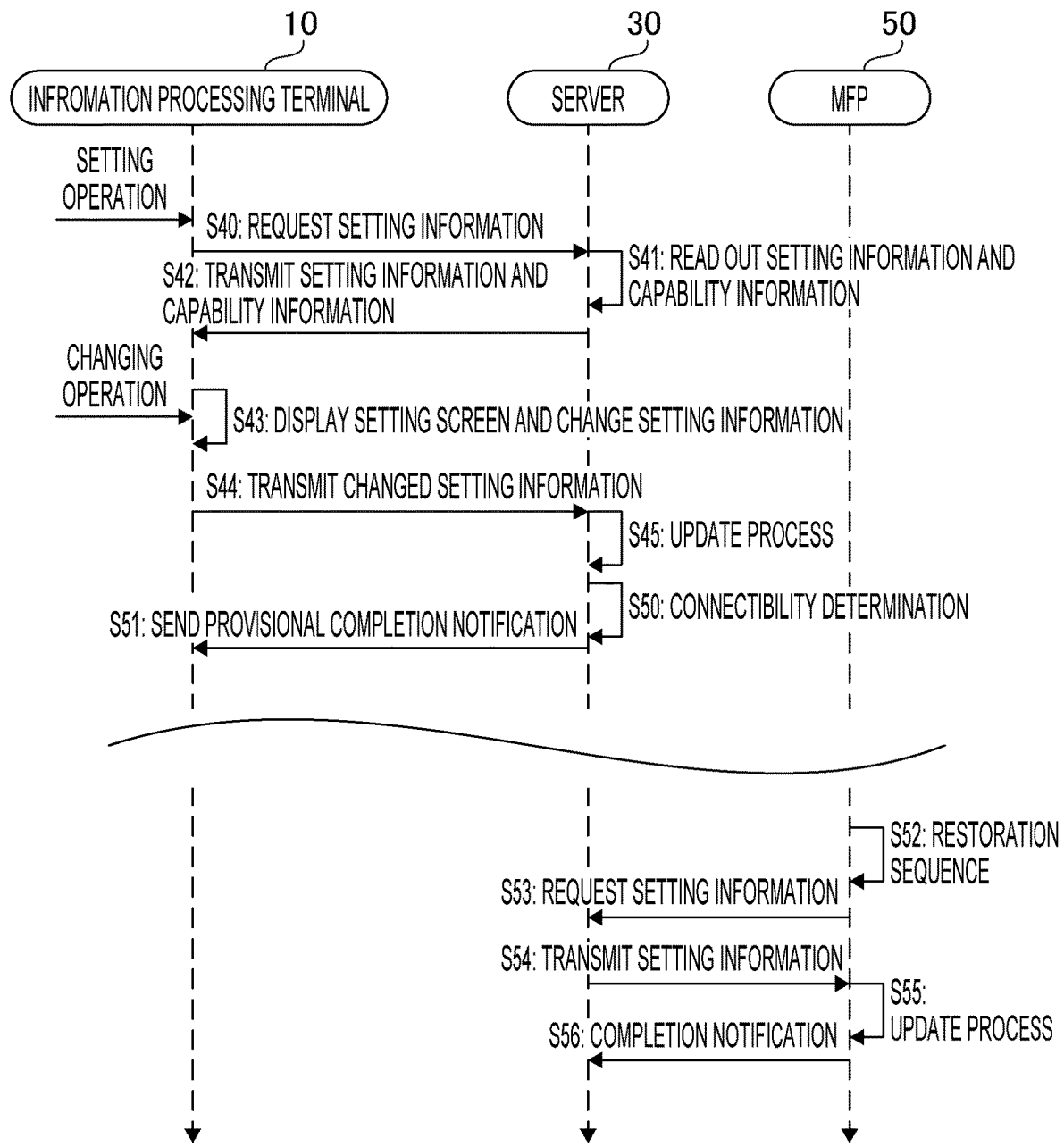
FIG. 10 is a timing chart showing a sequence of processes to be performed among the information processing terminal, the server, and the MFP when the setting information is changed, in a second illustrative embodiment according to one or more aspects of the present disclosure.

In the second illustrative embodiment, when the communication between the server 30 and the MFP 50 is interrupted in a situation of configuring the setting information SD, the setting information SD is transmitted from the server 30 to the MFP 50 after the communication is restored. FIG. 10 is a timing chart showing a sequence of processes in which the setting information, already stored in the server 30 and the MFP 50, is changed on the information processing terminal 10 side in the second illustrative embodiment. The processes shown in FIG. 10 are performed by the terminal-side CPU 12 executing the terminal-side control program 21, the server-side CPU 32 executing the server-side control program 41, and the controller 58 of the MFP 50.

In S45, the server-side CPU 32 of the server 30 stores the setting information SD and the program ID received from the information processing terminal 10, in association with each other. In S50, the server-side CPU 32 determines whether the server 32 is allowed to perform the communication with the MFP 50. Here, it is assumed that the wireless communication between the server 30 and the MFP 50 is interrupted. In S51, the server-side CPU 32 sends a provisional completion notification to the information processing terminal 10. For instance, the server-side CPU 32 may send, to the terminal-side CPU 12, a notification representing that the configuration of the setting information SD will be completed if the wireless communication is restored, along with the provisional completion notification. Thereby, the terminal-side CPU 12 is enabled to determine that the change of the setting information SD will be completed after the restoration of the wireless communication.

Thereafter, in S52, the controller 58 of the MFP 50 performs a restoration sequence to restore the wireless connection with the server 30. In S53, the controller 58 sends, to the server 30, a request to forward the changed setting information SD. In S54, the server-side CPU 32 forwards the setting information SD and the program ID to the MFP 50. In the second illustrative embodiment, after the wireless connection between the server 30 and the MFP 50 is restored, the controller 58 sends to the server 30 a request to transmit the setting information SD. Instead, the server-side CPU 32 may send to the MFP 50 a request to transmit the setting information SD.

In S55, the controller 58 of the MFP 50 stores the changed setting information SD and the program ID received from the server 30, in association with each other. In S56, the MFP 50 sends to the server 30 a completion notification representing that the change of the setting information SD_C has been completed.

The second illustrative embodiment described above produces the following advantageous effects. When the server 30 is unable to communicate with the MFP 50 via the network 200, the server-side CPU 32 forwards the already stored setting information SD and the program ID to the MFP 50 after the communication with the MFP 50 via the network 200 is restored. Thereby, even when the server 30 is temporarily unable to communicate with the MFP 50, the server 30 is enabled to forward the setting information SD to the MFP 50 after the communication with the MFP 50 is restored.

Third Illustrative Embodiment

In a third illustrative embodiment according to aspects of the present disclosure, different configurations from the aforementioned first illustrative embodiment will be mainly explained. In the third illustrative embodiment, each element having substantially the same configuration as in the first illustrative embodiment will be provided with the same reference numeral as in the first illustrative embodiment, and an explanation thereof may be omitted.

In the aforementioned first illustrative embodiment, the information processing terminal 10 configures the setting information SD individually for the MFP 50. Instead, in the third illustrative embodiment, the information processing terminal 10 may configure the setting information SD collectively for a plurality of MFPs 50. In the third illustrative embodiment, an explanation will be provided of an example case in which the information processing terminal 10 configures the setting information SD collectively for two MFPs 50a and 50b. In the following description, "a" and "b" may be added to the respective reference numerals for the two MFPs 50 to distinguish between them.

Figure 11:
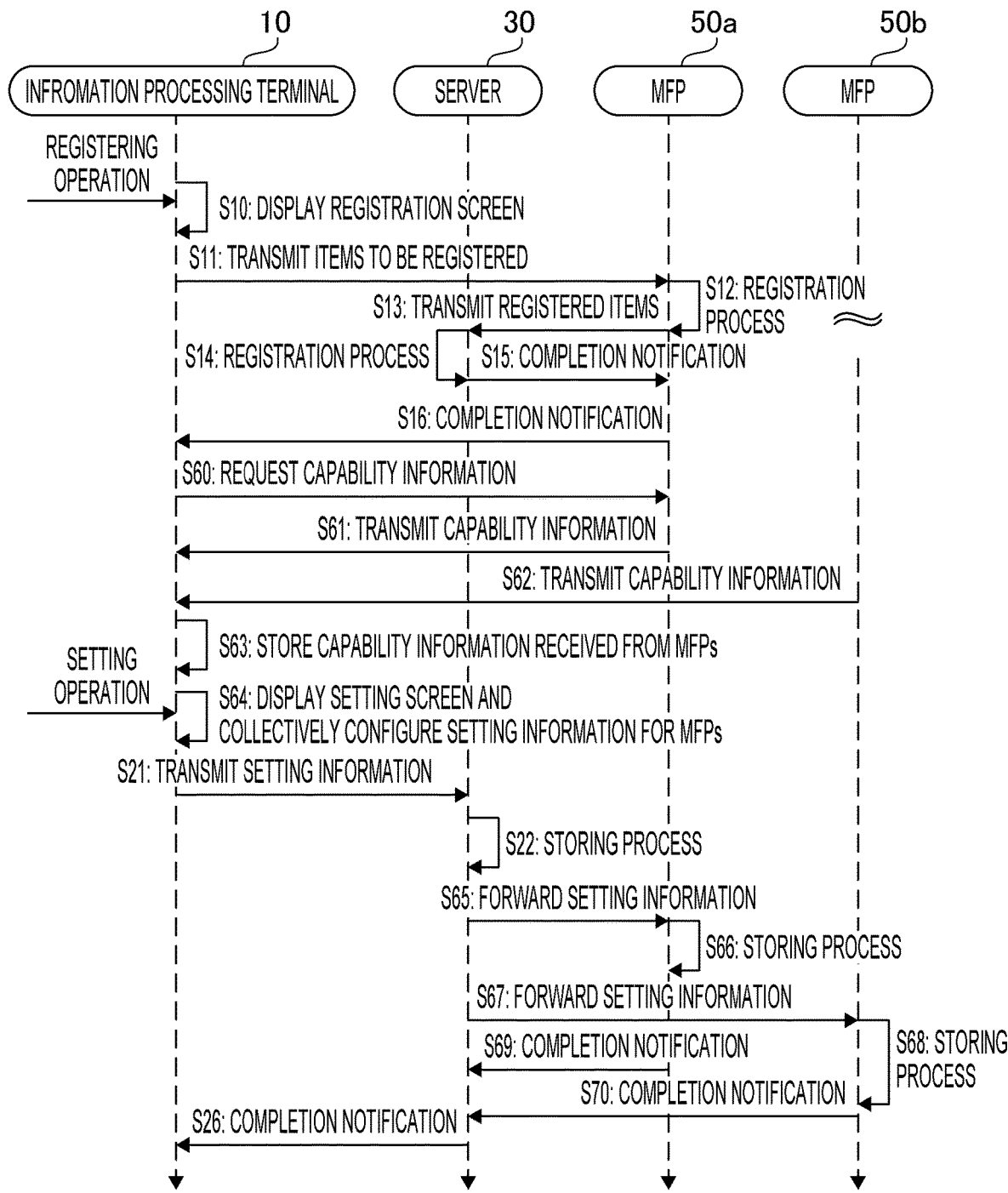
FIG. 11 is a timing chart showing a sequence of processes to be performed among the information processing terminal, the server, and a plurality of MFPs when the setting information is configured, in a third illustrative embodiment according to one or more aspects of the present disclosure.

In the third illustrative embodiment, processes shown in FIG. 11 are performed by the terminal-side CPU 12 executing the terminal-side control program 21, the server-side CPU 32 executing the server-side control program 41, and the controllers 58 of the MFPs 50a and 50b. Among the processes shown in FIG. 11, the processes of S10 to S16 are illustrated as processing only between the information processing terminal 10 and the MFP 50a. However, it is noted that substantially the same processes as S10 to S16 are actually performed between the information processing terminal 10 and the MFP 50b as well.

In S60, the terminal-side CPU 12 sends, to each of the MFPs 50a and 50b, a request for the capability information CP. In S61, the controller 58 of the MFP 50a reads out the capability information CP stored in the memory 59 of the MFP 50a, and transmits the read capability information CP to the information processing terminal 10. In S62, the controller 58 of the MFP 50b reads out the capability information CP stored in the memory 59 of the MFP 50b, and transmits the read capability information CP to the information processing terminal 10. In S63, the terminal-side CPU 12 stores the capability information CP received from each of the MFPs 50a and 50b into the memory 16.

In S64, the terminal-side CPU 12 displays, on the display 13, a setting screen for receiving user operations to configure the respective pieces of setting information SD for the MFPs 50a and 50b, and collectively configures the respective pieces of setting information SD for the MFPs 50a and 50b according to the user operations accepted via the setting screen. For instance, it is assumed that the capability information CP of the MFP 50a has "600 dpi HQ," "300 dpi STD," and "200 dpi Low" as settable values for the item "Resolution." Further, the capability information CP of MFP 50b has "300 dpi STD" and "200 dpi Low" as settable values for the item "Resolution." In this case, in an attempt to configure a setting value for "Resolution" in the setting information SD for each of the MFPs 50a and 50b, only "300 dpi STD" and "200 dpi Low," which are settable values in common for the MFPs 50a and 50b, are displayed as options in a pull-down list for "Resolution" on the setting screen. Meanwhile, "600 dpi HQ" is not displayed as an option in the pull-down list for "Resolution" on the setting screen.

When the respective pieces of setting information SD for the MFPs 50*a* and 50*b* have different items from each other, only items in common for the MFPs 50*a* and 50*b* may be settable on the information processing terminal 10. In this case, regarding items not in common for the MFPs 50*a* and 50*b* among the items included in the respective pieces of setting information SD for the MFPs 50*a* and 50*b*, current setting values for the items not in common may be applied as they are.

In S21, the terminal-side CPU 12 transmits to the server 30 the setting information SD accepted collectively via the touch panel 14 in S64, along with the program ID corresponding to the information processing terminal 10. In S22, the server-side CPU 32 of the server 30 stores the setting information SD and the program ID transmitted by the information processing terminal 10 in S21 into the memory 35 in association with each other.

In S65, the server-side CPU 32 forwards the setting information SD and the program ID to the MFP 50*a*. In S66, the controller 58 of the MFP 50*a* performs a storing process to store the setting information SD and the program ID received from the server 30 into the memory 59 of the MFP 50*a* in association with each other. In S67, the server-side CPU 32 forwards the setting information SD and the program ID to the MFP 50*b*. In S68, the controller 58 of the MFP 50*b* performs a storing process to store the setting information SD and the program ID received from the server 30 into the memory 59 of the MFP 50*b* in association with each other. It is noted that the individual pieces of setting information SD forwarded to the MFPs 50*a* and 50*b* in S65 and S67 are the same setting information SD as configured in S64.

In S69, the controller 58 of the MFP 50*a* sends to the server 30 a completion notification representing that the registration of the setting information SD_C has been completed. In S70, the controller 58 of the MFP 50*b* sends to the server 30 a completion notification representing that the registration of the setting information SD_C has been completed. When receiving the completion notifications from the MFPs 50*a* and 50*b*, in S26, the server-side CPU 32 of the server 30 sends, to the information processing terminal 10, a completion notification indicating that the registration of the setting information SD_M has been completed. By receiving the completion notification from the server 30, the terminal-side CPU 12 is enabled to determine that the registration of the setting information SD in each of the MFPs 50*a* and 50*b* has been completed.

The third illustrative embodiment described above produces the following advantageous effects. The terminal-side CPU 12 obtains the capability information CP that indicates the settable range of the setting information SD for each of the MFPs 50*a* and 50*b*, from each of the plurality of MFPs 50*a* and 50*b*, displays options as settable values in common for the plurality of MFPs 50*a* and 50*b* among the settable values included in the capability information CP of the plurality of MFPs 50*a* and 50*b*, and applies options selected by user operations accepted via the touch panel 14 to configure the setting information SD. Thus, the user is allowed to operate the information processing terminal 10 and configure the setting information collectively for the plurality of MFPs 50*a* and 50*b*.

Hereinabove, the illustrative embodiments according to aspects of the present disclosure have been described.

Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

MODIFICATIONS

In each of the aforementioned illustrative embodiments, the server 30 stores the setting information SD in the memory 35 and manages the setting information SD as a master. However, the server 30 may not store the setting information SD in the memory 35.

In the aforementioned illustrative embodiments, the MFP 50 uploads the scanned data to the server 30. Instead, for instance, when the information processing terminal 10 and the MFP 50 are in the same LAN, the MFP 50 may directly transmit the scanned data to the information processing terminal 10. In this case, when performing the scanning operation in S32 of FIG. 8, the MFP 50 may send a push notification to the information processing terminal 10. When receiving the push notification from the MFP 50, the terminal-side CPU 12 of the information processing terminal 10 may send a request for the scanned data to the MFP 50, and may receive the scanned data after execution of S36. In this case, the processes of S33 to S35 need not be executed.

The server 30 may store the setting information SD in an external storage device different from the memory 35. The server 30 may include a plurality of servers. In this case, the server 30 may include a server to manage the setting information SD and another server as an upload destination to which the scanned data transmitted by the MFP 50 is uploaded.

In each of the aforementioned illustrative embodiments, it is assumed that the scanning system 100 is configured using APNS or GCM for sending a push notification, and the destination information DI stores the display name and the program ID corresponding to the information processing terminal 10. Instead, the scanning system 100 may have a configuration in which the server 30 does not send a push notification to the information processing terminal 10. In this case, the destination information DI may store, in addition to the display name and the program ID, a MAC address, an IP address, and an e-mail address for identifying the location of the information processing terminal 10. The server-side CPU 32 may identify the addresses stored in the destination information DI, thereby communicating with the information processing terminal 10.

The following shows examples of associations between elements exemplified in the aforementioned illustrative embodiment and modifications and elements according to aspects of the present disclosure. The scanning system 100 may be an example of a "scanning system" according to aspects of the present disclosure. The MFP 50, the MFP 50a, and the MFP 50b may be included in examples of an "image scanner" according to aspects of the present disclosure, and may be included in "a plurality of image scanners" according to aspects of the present disclosure. The server 30 may be an example of a "server" according to aspects of the present disclosure. The information processing terminal 10 may be an example of an "information processing terminal" according to aspects of the present disclosure. The network 200 may be an example of a "network" according to aspects of the present disclosure. The touch panel 56 of the MFP 50 may be an example of a "first input interface" of the "image scanner" according to aspects of the present disclosure, and may be an example of an "input interface" of the "image scanner" according to aspects of the present disclosure. The scan engine 54 may be an example of a "scan engine" according to aspects of the present disclosure. The controller 58 of the MFP 50 may be an example of a "first controller" of the "image scanner" according to aspects of the present disclosure, and may be an example of a "controller" of the "image scanner" according to aspects of the present disclosure. The communication I/F 52 may be an example of a "communication interface" of the "image scanner" according to aspects of the present disclosure. The touch panel 14 of the information processing terminal 10 may be an example of a "second input interface" of the "information processing terminal" according to aspects of the present disclosure. The terminal-side CPU 12 and the memory 16 storing the terminal-side control program 21 may be included in a "second controller" of the "information processing terminal" according to aspects of the present disclosure. The terminal-side CPU 12 may be an example of a "processor" of the "information processing terminal" according to aspects of the present disclosure. The server-side CPU 32 and the memory 35 storing the server-side control program 41 may be included in a "third controller" of the "server" according to aspects of the present disclosure. The server-side CPU 32 may be an example of a "processor" of the "server" according to aspects of the present disclosure.

What is claimed is:

1. A scanning system comprising an image scanner, a server, and an information processing terminal that are interconnected via a network,
    wherein the image scanner comprises
        a first input interface,
        a scan engine, and
        a first controller configured to, when receiving via the first input interface an execution operation for instructing the image scanner to execute image scanning, cause the scan engine to perform the image scanning to generate scanned data based on scan setting information, and transmit the generated scanned data to at least one of the server and the information processing terminal,
    wherein the information processing terminal comprises
        a second input interface, and
        a second controller configured to
            configure the scan setting information according to a setting operation received via the second input interface, and
            transmit the configured scan setting information to the server via the network along with identification information for identifying the information processing terminal,
    wherein the server comprises a third controller configured to receive the scan setting information and the identification information transmitted from the information processing terminal, and forward the scan setting information and the identification information to the image scanner via the network, and
    wherein the first controller is further configured to
        store the scan setting information and the identification information forwarded from the server into a first memory in association with each other, the first memory being connected with the first controller, and
        when receiving, via the first input interface, the execution operation for instructing the image scanner to execute the image scanning and a specifying operation for specifying the information processing terminal as a destination of the scanned data, generate the scanned data with the information processing terminal as the destination of the scanned data, based on the scan setting information associated with the identification information in the first memory.

2. The scanning system according to claim 1, wherein the third controller is further configured to store the scan setting information transmitted from the information processing terminal into a second memory in association with the identification information, the second memory being connected with the third controller, and
    wherein the second controller is further configured to
        obtain the scan setting information stored in the second memory, based on the identification information, and
        change the obtained scan setting information according to a changing operation received via the second input interface.

3. The scanning system according to claim 1, wherein the third controller is further configured to
    store the scan setting information transmitted from the information processing terminal into a second memory in association with the identification information, the second memory being connected with the third controller, and
    when the server is unable to communicate with the image scanner via the network, forward the scan setting information and the identification information associated with each other in the second memory to the image scanner via the network after the communication between the server and the image scanner is restored.

4. The scanning system according to claim 3, wherein the first controller is further configured to
    when the communication between the server and the image scanner is restored, send to the server a request for the scan setting information and the identification information associated with each other in the second memory, and
    perform the image scanning based on the scan setting information and the identification information transmitted from the server in response to the request.

5. The scanning system according to claim 1, wherein the first controller is further configured to, when receiving, via the first input interface, the specifying operation for specifying the information processing terminal as the destination, cause a first display to display the scan setting information stored in the first memory in association with the identification information of the information processing terminal specified as the destination, the first display being connected with the first controller.

6. The scanning system according to claim 1, wherein the second controller is further configured to:

obtain, from the image scanner, capability information indicating a settable range of the scan setting information for the image scanner; and configure the scan setting information according to the setting operation received via the second input interface, within the settable range indicated by the obtained capability information.

7. The scanning system according to claim 1, wherein the third controller is further configured to obtain, from the image scanner, capability information indicating a settable range of the scan setting information for the image scanner, and forward the obtained capability information to the information processing terminal, wherein the second controller is further configured to configure the scan setting information according to the setting operation received via the second input interface, within the settable range indicated by the capability information forwarded from the server.

8. The scanning system according to claim 1, further comprising a plurality of image scanners including the said image scanner, and wherein the second controller is further configured to
obtain, from each of the plurality of image scanners, capability information indicating a settable range of the scan setting information for each image scanner,
cause a second display to display options settable in common for the plurality of image scanners, based on the capability information obtained from each image scanner, the second display being connected with the second controller, and
apply one or more options selected by a selecting operation received via the second input interface, to configure the scan setting information.

9. The scanning system according to claim 1, wherein the second controller comprises:
a processor; and
a memory storing computer-readable instructions configured to, when executed by the processor, cause the second controller to
configure the scan setting information according to the setting operation received via the second input interface, and
transmit the configured scan setting information to the server via the network along with identification information for identifying the information processing terminal.

10. The scanning system according to claim 1, wherein the third controller comprises:
a processor; and
a memory storing computer-readable instructions configured to, when executed by the processor, cause the third controller to receive the scan setting information and the identification information transmitted from the information processing terminal, and forward the scan setting information and the identification information to the image scanner via the network.

11. A non-transitory computer-readable medium storing computer-readable instructions executable by a processor of an information processing terminal connectable with an image scanner and a server via a network, wherein the instructions are configured to, when executed by the processor, cause the information processing terminal to
configure scan setting information according to a setting operation received via an input interface of the information processing terminal, and
transmit the configured scan setting information to the server via the network along with identification information for identifying the information processing terminal, thereby causing the server to forward the scan setting information to the image scanner, and wherein the image scanner is configured to
when receiving an execution operation for instructing the image scanner to execute image scanning via an input interface of the image scanner, cause a scan engine to perform the image scanning to generate scanned data based on the scan setting information forwarded from the server, and
transmit the generated scanned data to at least one of the server and the information processing terminal.

12. A non-transitory computer-readable medium storing computer-readable instructions executable by a processor of a server connectable with an image scanner and an information processing terminal via a network, the instructions being configured to, when executed by the processor, cause the server to:

receive scan setting information and identification information from the information processing terminal via the network, the identification information identifying the information processing terminal; and
forward the scan setting information and the identification information to the image scanner via the network, wherein the image scanner is configured to
when receiving an execution operation for instructing the image scanner to execute image scanning via an input interface of the image scanner, cause a scan engine to perform the image scanning to generate scanned data based on the scan setting information forwarded from the server, and
transmit the generated scanned data to at least one of the server and the information processing terminal.

13. An image scanner comprising:
a communication interface configured to communicate with a server and an information processing terminal via a network;
an input interface;
a scan engine configured to perform image scanning and generate scanned data based on scan setting information; and
a controller configured to
receive, via the communication interface, the scan setting information and identification information forwarded from the information processing terminal through the server, the identification information identifying the information processing terminal,
store the scan setting information and the identification information into a memory in association with each other, the memory being connected with the controller, and
when receiving, via the input interface, an execution operation for instructing the image scanner to execute the image scanning and a specifying operation for specifying the information processing terminal as a destination of the scanned data, cause the scan engine to perform the image scanning and generate the scanned data with the information processing terminal as the destination, based on the scan setting information associated with the identification information in the memory.

* * * * *